July 12, 1960

A. G. EICKMEYER 2,944,966

METHOD FOR SEPARATION OF FLUID MIXTURES

Filed Feb. 19, 1954

INVENTOR.
Allen G. Eickmeyer.
BY
Fishburn t Mullendore
ATTORNEYS.

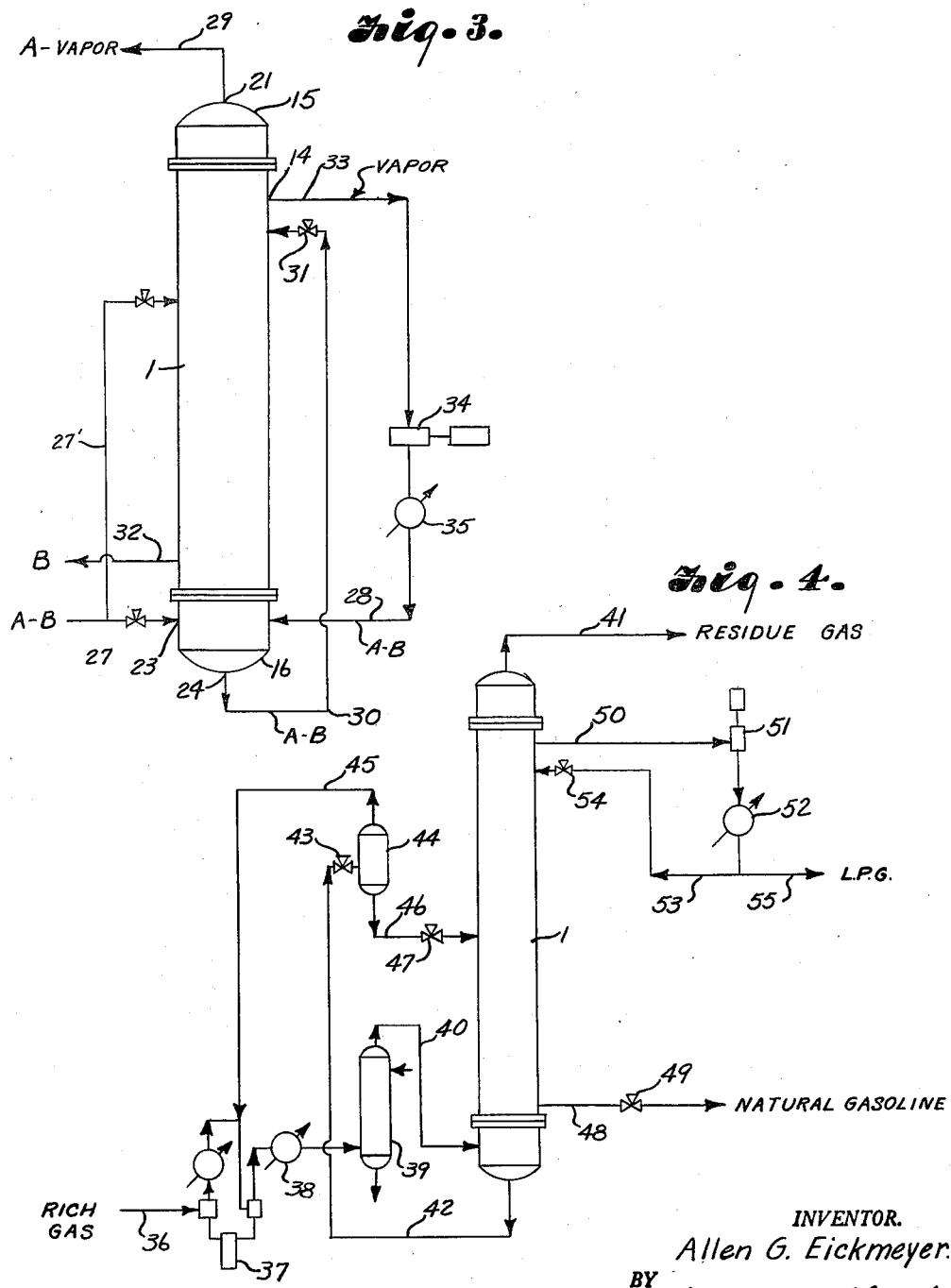

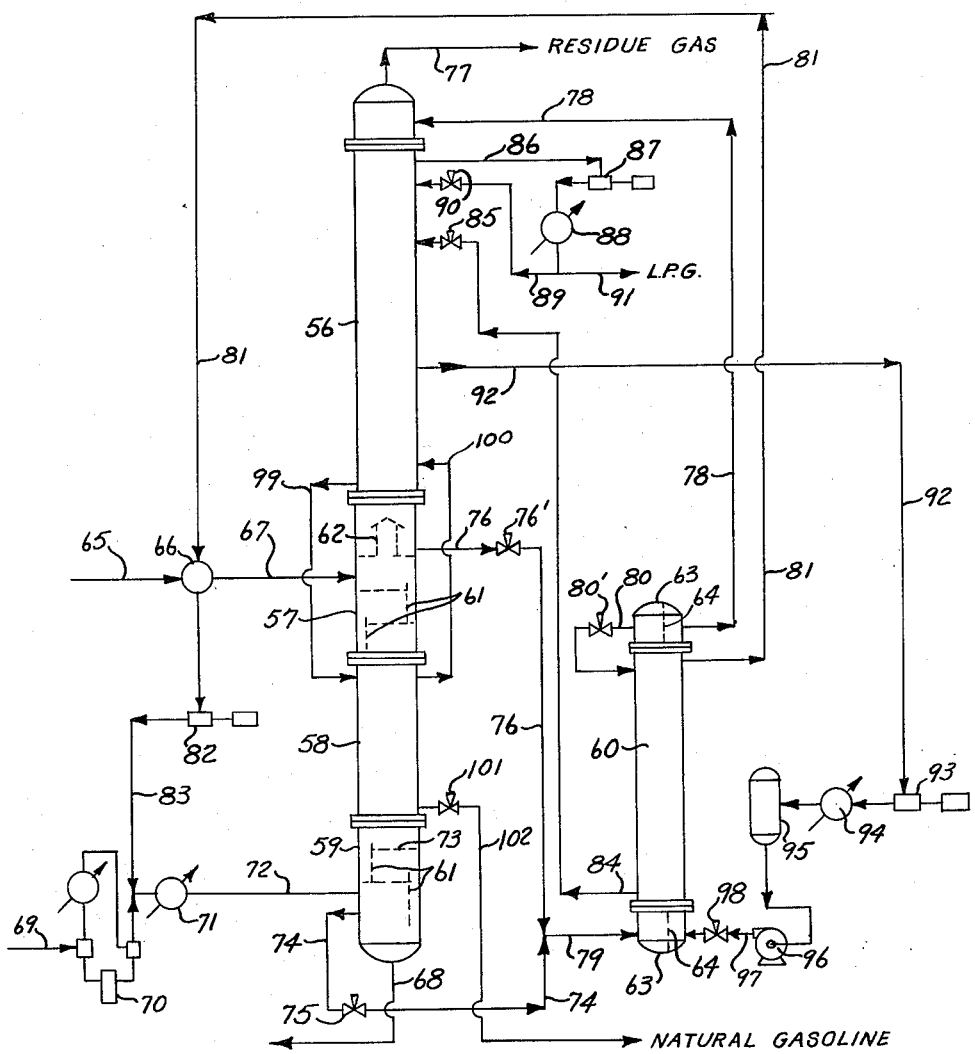

July 12, 1960 A. G. EICKMEYER 2,944,966
METHOD FOR SEPARATION OF FLUID MIXTURES
Filed Feb. 19, 1954 4 Sheets-Sheet 4

INVENTOR.
Allen G. Eickmeyer.
BY
*Fishburn & Mullendore*
ATTORNEYS.

United States Patent Office 2,944,966
Patented July 12, 1960

2,944,966

METHOD FOR SEPARATION OF FLUID MIXTURES

Allen G. Eickmeyer, 7204 Cherokee Drive, Prairie Village, Kans.

Filed Feb. 19, 1954, Ser. No. 411,389

9 Claims. (Cl. 208—352)

This invention relates to method of and apparatus for separation of fluid mixtures, such as liquids, gases and/or vapors. More particularly, the invention relates to a method and apparatus for performing separations by fractionation, rectification, stripping, absorption, dephlegmation, and especially by combinations of these operations.

In the process of fractional distillation (or fractionation), a mixture of two or more components, with different volatilities, is fed to an intermediate point of a fractionating column wherein ascending vapor is intimately contacted with descending liquid. The more volatile components are preferentially distributed into the vapor phase and are recovered overhead relatively free of the less volatile components which are discharged from the column as a bottoms product. The vapors are generated by heating the bottoms, and liquid reflux is provided at the top of the column by condensing part or all of the overhead vapors and returning all or a portion of the condensate to the column. Thus heat is introduced at the bottom of the column and extracted at the top of the column at a lower temperature level. The section below the feed point is usually called the stripping section and that above the feed point the rectifying or enriching section. In the case of normally gaseous mixtures, the separation may be performed at subnormal temperatures using heat extraction by a relatively expensive refrigeration system, which requires external mechanical or heat energy for effecting operation thereof.

In performing separations by absorption and stripping, analogous processing by counter-current contacting of liquids and gases is practiced. Herein the term "processing" means performing a separation in a zone of counterflowing liquid and vapor.

In the present state of the art, numerous contacting devices have been developed, such as towers containing packing, bubble cap trays, sieve trays, baffles, grid trays, bubble valves, rotating vanes, and the like. Also, effort has been made to utilize heat more efficiently, particularly in low temperature fractionation processes where "heat pumps" and compression of process streams have been used to transport heat from the top of the column to the bottom of the column. Furthermore, dephlegmation (sometimes called partial condensation) has been used in some cases when the feed gas stream is under super-atmospheric pressure.

In low temperature separation plants designed by Claude, the feed gas has been brought into the bottom of a dephlegmator and passed up through tubes which were refrigerated on the outside. The liquid reflux condensing from the gas and flowing down through and from the bottoms of the tubes has been expanded by throttling to a lower pressure and then passed to the outside of the tubes where it serves as the refrigerant by vaporizing. However, the throttled liquid, while richer in the less volatile components than the feed, was still a mixture of components and the vapors withdrawn from outside the tubes had not undergone further separation and were therefore the same composition as the liquid.

The method of the present invention is a distinct improvement over Claude's method in that fully fractionated products are obtained. Moreover, the apparatus of the present invention is designed to make full use of all the heat exchange surface area by providing a descending liquid film over all such surface area in a manner well suited not only to heat transfer through the metal wall forming such surface areas, but also to mass transfer between the descending liquid films and ascending vapors on both sides of the metal wall. Intimate contact and consequent mass transfer between descending liquid and ascending vapor is essential to separation of mixtures by fractionation.

Also, both Claude and Van Nuys have designed separation processes using selective liquefaction with backward return of the liquid (dephlegmation) and subsequent rectification of that liquid at a lower pressure. However, in order to rectify the liquid, they have condensed the gas leaving the top of the dephlegmator and throttled this condensate to the lower pressure of the rectification in order to supply reflux at the top of the column. Thus the more volatile overhead product leaves the process at a low pressure. This is a disadvantage in those cases where it is desired to use the separated, more volatile gas at elevated pressure, since this gas, which may be a large volume, would then have to be recompressed. Also, in the rectification, Claude and Van Nuys have used conventional trays for performing the rectification, thus requiring additional equipment. In the process of the invention, I overcome the above mentioned disadvantage and also perform the separation in less equipment.

An object of the present invention is to combine dephlegmation and stripping in heat exchange relationship so as to produce relatively pure fractionated products. Similarly, dephlegmation and fractionation, or absorption and stripping, or absorption and fractionation can be combined. In general, the invention involves a combination of heat exchange and processing having countercurrent contacting of liquids and vapors on one or both sides of a heat exchange surface and resulting in fractionated products.

A further object of the invention is to provide an apparatus for the counter-current contacting of process streams in multiple process zones with said zones being separated by heat exchange surface.

Another object of the invention is to provide multiple processing steps in contiguous processing zones with said zones being in heat exchange relationship.

Another object is to provide a separation process wherein processing zones requiring heat introduction and heat extraction are operated under conditions which permit them to be placed in heat exchange relationship.

A further object of the invention is to provide a process including dephlegmation and stripping steps, with heat being transferred throughout from the dephlegmation step to the stripping step.

A still further object of the invention is to provide a low temperature separation process having low energy requirements.

A further object of the invention is to combine dehydration with a low temperature separation in such a way as to render the desiccant more effective.

In accomplishing these and other objects of the invention, hereinafter pointed out, I have provided improved methods and apparatus, the preferred forms of which are illustrated in the accompanying drawings, wherein:

Fig. 3 illustrates the combination dephlegmating and stripping unit in an apparatus for the separation of a fluid mixture into two products.

Fig. 4 is a similar view illustrating the combination dephlegmation and fractionation unit in an apparatus for separation of multicomponent mixture, such as a natural gas, into three products.

Fig. 5 is a similar view of an apparatus involving absorption and fractionation for the separation of multicomponent mixture, such as a natural gas, into three or four products.

Herein, the terms "gas" and "vapor" are used synonymously since a normally gaseous material may be condensed or absorbed under suitable temperatures and pressures.

Figure 1:
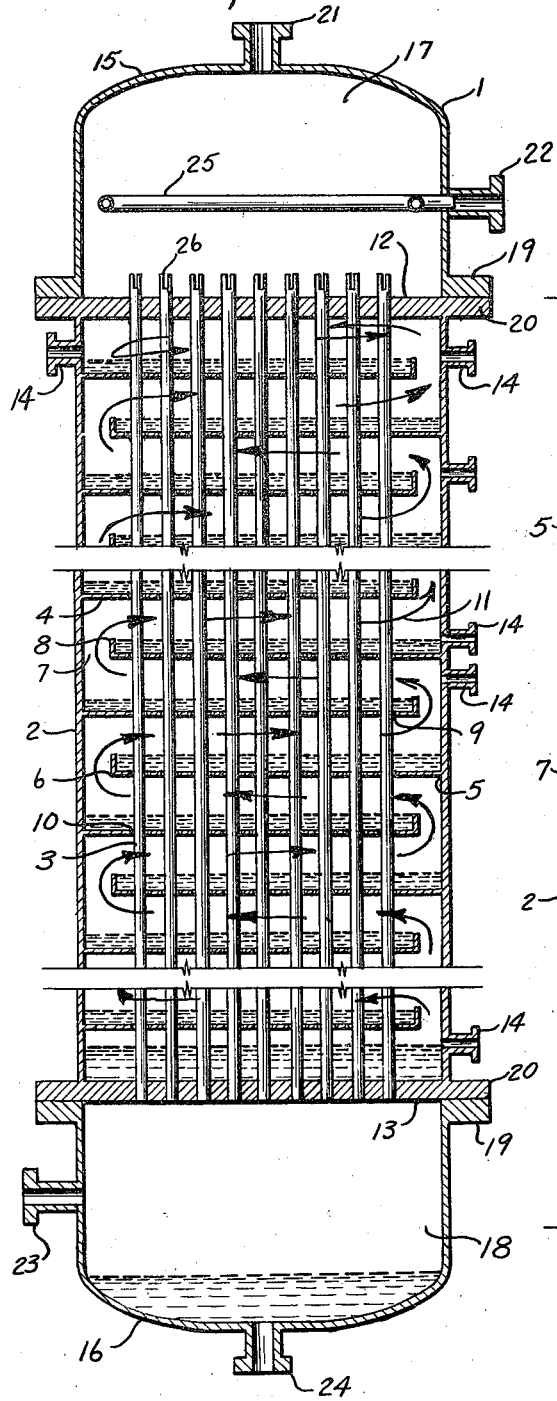
Figure 1 is a vertical section of one form of the apparatus for combining heat exchange and processing of fluid mixtures in a single vessel.
Figure 2:
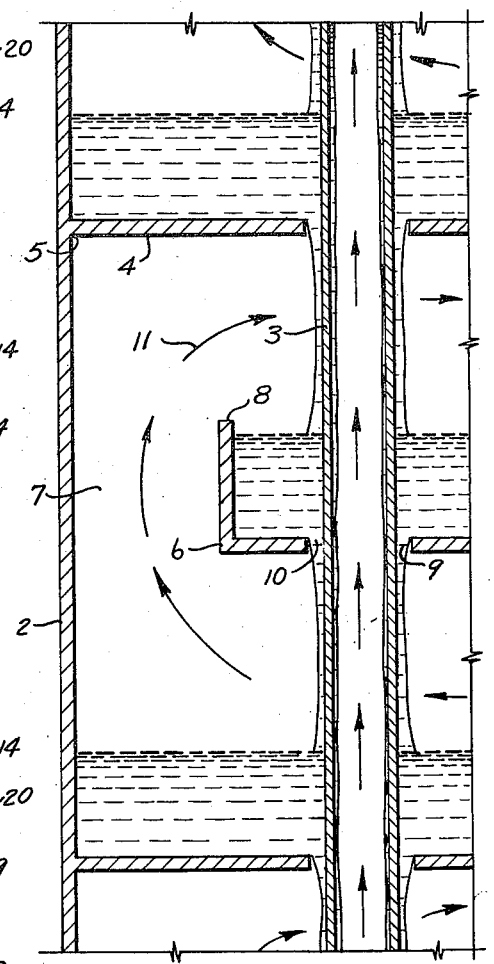
Fig. 2 is an enlarged fragmentary view of a portion of the unit illustrated in Fig. 1 and showing the contact and flow of the fluids.

Referring to Fig. 1, 1 designates a combination dephlegmating and stripping unit including a vertical shell 2, enclosing a bundle of vertical tubes 3 that extend through horizontal baffle trays 4. The baffle trays 4 have peripheral edges 5, sealed relatively to the shell 2 except at one side 6, to provide passage-ways 7. The sides 6 of the trays are provided with vertical lips 8. The baffle trays have openings 9 to pass the tubes 3 with sufficient clearance to provide an annular passage-way 10 around each tube. The openings 9 need not be circular. The periphery of the holes may be serrated or otherwise suitably shaped for centering the tubes therein. The lips 8 are for retaining liquid on the baffle trays 4, so that liquid is caused to flow downwardly through the openings 9 and descend as a film over the outside surface of each of the tubes 3. In some cases, such as relatively large apertures 10 for a given liquid load, the lips 8 may be eliminated. The side edges 6 of the baffle trays are alternately arranged to provide a zig-zag horizontal flow 11 of ascending gas or vapors between the respective trays and in intimate contact with the descending films of liquid on the respective tubes.

The ends of the tubes 3 are rolled into the upper and lower tube sheets 12 and 13 in the usual manner of fabricating heat exchangers. The shell 2 is provided with suitably located nozzles 14 for the inlet and outlet of various process streams. The ends of the shell are closed by covers 15 and 16 that form manifolds 17 and 18 interconnecting the tubes 3. The covers 15 and 16 may be welded directly to the shell 2 or may have conventional flanges 19 that are bolted or otherwise secured to similar flanges 20 on the wall of the shell, suitable gaskets being preferably inserted between the flanges to provide leak tight joints. The covers have nozzles 21—22 and 23—24 respectively, for the inlet and outlet of process streams.

In the event liquid is to be brought into the top cover and passed down through the inside of the tubes, the nozzle 22 is connected to an internal distribution ring 25 or header (not shown) in the conventional manner and the upper ends of the tubes 3 are preferably extended above the upper tube sheet 12 and provided with slots 26, or other suitable means for the uniform distribution of liquid.

It will be seen that the baffle trays 4 serve not only to distribute the liquid in a positive manner as a falling or descending film over the tubes but also to cause the ascending gas or vapor to pass back and forth across the tube bundle as indicated by the arrow and into contact with the liquid film which wets the tube bundle, thus resulting in very intimate contact between the counter-current liquid and vapor.

Also, the liquid on the inside of the tubes falls as a film and intimately contacts the ascending gas.

A salient feature of the unit 1 is that both inside and outside the tubes, the liquid clings to the tube walls due to surface tension. This permits the use of higher superficial gas or vapor velocities than is normally possible in the ordinary bubble tray column without serious entrainment. The high velocities not only reduce the size of the equipment but also enhance the heat and mass transfer coefficients.

Hence, the unit 1 is well suited to counter-current contacting in contiguous processing zones where the process in one zone releases heat to a process in another zone which absorbs heat. The temperature at which the heat is transferred may be above, at, or below normal temperatures. Also, the equipment may be applied to advantage in cases where counter-current contact is performed on only one side of the heat exchange surface as illustrated later.

Hereafter, the zone inside the tubes is termed the "tube side" and the zone outside the tubes the "shell side" in accordance with heat exchanger parlance.

One of the limitations of many contacting devices is the lack of wide flexibility in capacity for handling satisfactorily both high and low throughputs. The limitation with bubbling type devices is generally due to the low surface contact area available between liquid and vapor at low throughput. Also, the hydraulic gradient of liquid flow across bubble trays may cause poor vapor distribution at high liquid loads.

It is apparent that no cross flow of the liquid is used in the present apparatus and therefore the problem of hydraulic gradient is eliminated. Also, the contact area between liquid and vapor is held essentially constant due to the falling film being spread out on the tubes by surface tension.

The wide flexibility in liquid capacity of the baffle trays has been proved by tests of liquid downflow capacity at various liquid heads. The liquid capacity increased six fold between heads of ⅛" and 4". Desired vapor capacity may be provided by adjusting spacing between baffle trays.

Fig. 3 illustrates a method in which the unit 1 is employed for dephlegmation and stripping operations that are placed in heat exchange relation for the separation of a mixture into two products. The mixture may be either a multicomponent mixture or a binary mixture of two components having different volatilities.

Let A and B represent the separated products, A being more volatile than B. The feed mixture of A and B is conducted under pressure through line 27 into the nozzle 23 of the bottom cover 16 of the unit 1 (except that the tubes are not extended above the upper tube sheet). The mixture may be liquid or vapor but is ordinarily part liquid and part vapor at the temperature and pressure of entering the cover 16. A recycled mixture in line 28 also enters cover 16. The vapor portions of the feed and recycle mixtures rise through the tubes 3 (tube side of unit), and are cooled by transfer of heat through the walls of the tubes 3 and fractionally condensed. The liquid condensate, which falls back, preferentially separates B from the vapor, so that A leaves the top of the apparatus through the nozzle 21 and a line 29 as a vapor at its dew point.

The liquid collecting in cover 16 is removed through nozzle 24 and line 30, throttled to a lower temperature and pressure by valve 31, and admitted to the upper end of the shell side of the unit 1.

The liquid distributes over the upper tray, passes through the openings 9 thereof, and descends over the outside of the tubes. The descending liquid on the shell sides of the tubes is warmed and progressively vaporized by the heat extracted from the tube side. A, being more volatile, is preferentially stripped by ascending vapor, which moves in a zig-zag path between the trays so that B leaves the bottom of the shell through line 32 in either the liquid or vapor state. The stripped vapors, a mixture of A and B, are removed from the shell side through one of the nozzles 14 and line 33, compressed by compressor 34, cooled, as needed, by cooler 35, and recycled to the tube side through line 28, thus completing the cycle. Countercurrent contacting of liquids and vapors, which enhance the separation, occurs on both the tube and shell sides. In this regard, the tube side is analogous to the rectifying section and the shell side to the stripping section of a conventional fractionating column.

The pressure maintained on the shell side by throttle valve 31 and compressor 34 is such that the liquid on the shell side boils at a lower temperature than that obtained just opposite on the tube side, thus providing a temperature difference to cause flow of heat from the tube side to the shell side.

The feed to unit 1 of Fig. 3 may alternatively be admitted to the shell side through line 27. This feed point is preferred when the feed mixture contains a high concentration of the less volatile component.

It is apparent that the shell may be the high pressure side, if desired, and the feed can be brought into the shell side and the liquid from the bottom of the shell throttled through valve 31 and admitted to the top of the tube side. In many cases, this arrangement is preferred from the standpoint of providing better matched temperature profiles on the tube and the shell sides. In the separation of a less volatile component present in relatively low concentration in the feed mixture, for example 6% ethane in methane, the feed could be introduced to the shell at a point part way up from the bottom and the recycled stripped vapors from the tube side could be brought into the bottom of the shell. This provides a wider range in temperature on the shell side from the bottom to the top, matching a wide range in the stripping section on the tube side.

Since the heat transferred through the tubes (the duty of the fractionating exchanger) is kept within the system, an overall heat balance is provided to obtain the separated products A and B at specific conditions, i.e. vapor or liquid at temperature and pressure. The overall heat balance may be provided in several ways, such as adjusting the condition of the feed, the degree of cooling after compressing the recycle, or, in low temperature applications, the extent of heat exchange between lines 33 and 28 (heat exchanger not shown). The preferred means will depend upon the specific separation to be made and will be apparent to those skilled in the art.

In the case of a low temperature separation, such as the separation of oxygen and nitrogen from air, heat exchange or recuperation would be used between the feed and product streams, 27, 29, and 32, and between various other process streams such as 29 with 30, and 33 with 28, for the conservation of refrigeration in attaining and maintaining the operating temperatures required. Also, a suitable refrigeration cycle, employing an expander, throttling of a high pressure stream, or a cascade system, would be used to make up refrigeration lost due to heat leak and incomplete refrigeration recovery. The use of these devices, when required, will be apparent to those skilled in the art, and therefore they have been omitted from the general case for the sake of clarity.

In an air separation plant where the prime object is the production of nitrogen and maximum recovery of oxygen is not essential, the process shown in Fig. 3 may be simplified. The gas leaving the top of the shell side through line 33 is nearly the same composition as the feed stream of air in line 27. Therefore, compressor 34 and aftercooler 35 may be eliminated and the gas in line 33 wasted to the atmosphere after heat exchange with the feed stream to recover the refrigeration of the cold gas. Alternatively, this gas may be recycled through the main air compressor (not shown) used to compress the feed air in line 27.

Fig. 4, showing the unit 1 in a method for combination of dephlegmation and fractionation and Fig. 5 in a method combining absorption and fractionation will be described with reference to specific examples for the recovery of LPG and natural gasoline from natural gas. However, the processes may be applied to many other multicomponent mixtures.

Referring to Fig. 4, rich gas containing 8.5 gallons of propane and heavier per thousand standard cubic feet is gathered in line 36 at 90° F. and 19 p.s.i.a., compressed to 300 p.s.i.a. in two stages by compressor 37, aftercooled by cooler 38, dehydrated by conventional glycol contactor 39, and admitted at a temperature of 100° F through line 40 to the lower end of the tube side of the unit 1 which acts as a fractionating exchanger. Liquid hydrocarbons are fractionally condensed from the gas by progressive cooling inside the tubes and relatively lean residue gas is discharged through line 41 at a temperature of 46° F. The hydrocarbon condensate is discharged through line 42 and throttle valve 43 into flash drum 44 at 75 p.s.i.a., where dissolved methane and ethane together with part of the propane is flashed off as vapor and recycled through line 45 to the main gas stream entering the second stage of compressor 37. The liquid in flash drum 44 is at 25° F. and it is sent through line 46 and valve 47 to a midpoint of the shell side of the unit 1, where the pressure is 15 p.s.i.a. Part of the liquid flashes to vapor upon passing through valve 47 and the remaining liquid is distributed over the tubes of the apparatus by the baffle trays. Propane and most of the butane is stripped out of the liquid by heat extracted from the tube side so that the remaining liquid, collected at the bottom of the shell at 87° F. and withdrawn through line 48 and control valve 49, is a finished natural gasoline product with a Reid vapor pressure of 18# at 100° F. The vapors ascending on the shell side are rectified by refluxing liquid, which washes back down the pentanes and heavier, with the result that the vapors leaving the top of the shell side through line 50 and 16° F. are substantially propane, iso butane, and normal butane. These vapors are compressed to 90 p.s.i.a. by compressor 51 and liquified in condenser 52. A portion of the liquid is returned as reflux to the shell side by line 53 and valve 54 and the remainder, withdrawn through line 55, is the LPG product, which meets commercial specifications and has a vapor pressure of 75 p.s.i.g. at 100° F. The liquid reflux serves not only to prevent pentanes and heavier from contaminating the LPG but also to provide the outside refrigeration required to cool the gas and to produce the liquid gasoline stream from a gaseous feed. The quantity of reflux is controlled by valve 54 so as to maintain the gasoline in line 48 at a temperature of 87° F.

Per thousand cubic feet of rich gas 1.95 gallons of natural gasoline and 1.4 gallons of LPG are recovered, and 4.5 horsepower hours are required for compression of the rich gas (including 0.1 H.P. hour for the recycle gas from line 45) and 0.52 H.P. hour for the LPG compressor 52. Thus 3.35 gallons of liquid products are recovered and fractionated with the expenditure of 0.62 H.P. hour above that required for the gas compression alone.

Referring to Fig. 5, the separation equipment comprises five processing sections, 56, 57, 58, 59 and 60. The sections 56, 57, 58, and 59 are mounted one upon another in coaxial relation. The section 56 serves as an absorber-fractionator, the section 57 as a low temperature dehydrator, the section 58 as a cooler-stripper, and the section 59 as a dehydrator. The absorber-fractionator 56 and the cooler-stripper 58 are both similar to the unit 1 shown in Fig. 1 except that three tube covers are replaced by the sections 57 and 59, thus providing a continuous passageway upwards through section 59, the tube side of section 58, section 57, and the tube side of section 56 to the top of the apparatus. Sections 57 and 59 are both provided with conventional bubble trays and downcomers 61 for dehydrating the gas by contacting it with glycol. The upper end of section 57 is also provided with a chimney tray 62 for the purpose of withdrawing liquid descending from the tube side of section 56.

The fifth processing section, a deethanizer-cooler 60, is also similar to the unit of Fig. 1 with each of the tube covers 63 divided into compartments by divider plates 64. The shell side of section 60 is not divided into compartments.

Glycol from a conventional regeneration system (not shown) is brought in at 90° through line 65, cooled to 50° F. by heat exchanger 66, and introduced through line 67 into low temperature dehydration section 57 just above the bubble trays that carry the downcomers 61. The glycol passing down through sections 57, 58 and 59 contact and dehydrate the ascending gas, thus preventing hydrate formation at subsequent low temperatures. Glycol containing absorbed water is discharged from the bottom of section 59 and sent through line 68 to the regeneration system where water is removed before returning through line 65.

The same rich gas used in the above example is gathered in line 69 at 90° F. and 17 p.s.i.a. compressed to 200 p.s.i.a by two stage compressor 70, aftercooled to 100° F by cooler 71 and conducted through line 72 into section 59 below the bubble trays 73 thereof. The gas is partially dehydrated at 100° F. by contact with glycol in section 59, cooled to 50° F. with some condensation of heavy ends in the tube side of section 58, and further dehydrated at 50° F. in low temperature dehydration section 57. This arrangement, with the gas contacting a progressively colder desiccant, results in a lower dew point than is obtainable with a conventional dehydration system. Condensate from the tube side of section 58, collected at a temperature of 100° F. as an upper layer floating on the glycol at the bottom of section 59, is withdrawn through line 74 and control valve 75 to join a liquid stream from line 76 described later. Dehydrated gas passes through chimney tray 62 and the tube side of absorber-fractionator 56 wherein the higher hydrocarbons are absorbed in butane. The residue gas, is chilled to −5° F. before leaving overhead through line 77. The butane solvent at −20° F. is brought through line 78 into the top tube cover of section 56 and distributed uniformly to the tubes, which extend slightly above the tube sheet with the ends slotted as shown at 26 in Fig. 1. The butane is chilled at −80° F. to compensate for the warming effect of becoming saturated with gas.

Liquid, consisting of butane and the absorbed hydrocarbons, including some unwanted methane and ethane, collected on chimney tray 62 at 49° F., is removed through line 76 and control valve 76', joining the 100° F. condensate in line 74 to give a mixture at 52° F. in line 79. This mixture is brought into the larger compartment of the bottom tube cover of the deethanizer-cooler 60, wherein the mixture is subcooled to −20° F. (in the smaller compartment of the tube side, butane solvent is simultaneously chilled from 90° F. to −20° F.). The subcooled mixture is removed through line 80, throttled by valve 80' to a pressure of 38 p.s.i.a., and sent to the top of the shell side of deethanizer-cooler 60. Upon throttling, some of the liquid, mainly the methane and ethane, flashes to vapor lowering the temperature to −36° F. The cold liquid passing down over the tubes is warmed to 47° F. and stripped of residual methane and ethane by the sensible heat of the liquids being chilled on the tube side. This procedure of subcooling before flashing and stripping results in substantially complete deethanization with relatively little loss of propane as compared with the usual simple flash wherein the separation is incomplete. The flashed and stripped vapors are removed through line 81, warmed to −6° F. in heat exchanger 66, compressed to 200 p.s.i.a. by recycle compressor 82, and recycled through line 83 joining the main gas stream leaving compressor 70.

The deethanized liquid is discharged through line 84 and throttled to 15 p.s.i.a. by control valve 85, entering the shell side of section 56 at an intermediate point. Herein the propane and most of the butanes are separated from the liquid at temperatures ranging from 45° F. at the bottom to −11° F. at the top of the shell side, the heat being extracted from the tube side, wherein temperatures ranged from 50° F. to −5° F. Propane, iso butane, and normal butane vapor are withdrawn at the top through line 86, compressed to 150 p.s.i.a. by LPG compressor 87, and condensed to liquid in condenser 88. A small portion of the liquid is returned as reflux through line 89 and valve 90, and the balance withdrawn through line 91 is the mixed LPG product having a vapor pressure of 135 p.s.i.g. at 100° F.

The solvent, which is mainly normal butane, also serves as a refrigerant by being vaporized at low pressure in the process. The solvent vapors are withdrawn from a lower intermediate point on the shell side of section 56 through line 92 to butane compressor 93 and discharged at 50 p.s.i.a. through condenser 94 to receiver 95. The pressure of liquid butane from receiver 95 is boosted to 210 p.s.i.a. by pump 96. The butane is then sent through line 97 and control valve 98 to the deethanizer-cooler where it is chilled from 90° F. to −20° F. before returning to the top of section 56 as heretofore described.

The bottom of the shell of section 56 and the top of the shell of section 58 are in communication by liquid line 99 and vapor line 100 so that excess butane contained in the descending liquid is stripped out in the shell of section 58 and returned to the shell of section 56. The residual liquid discharged at a temperature of 87° F. through valve 101 and line 102 is a natural gasoline product having a Reid vapor pressure of 18 pounds.

The product yields per thousand cubic feet of rich gas are 766 standard cubic feet of residue gas (measured before fuel gas is removed), 5.2 gallons of LPG, and 2.0 gallons of natural gasoline. On the same basis the rich gas compressor 70 required 4.0 horsepower hours and the recycle compressor 82, LPG compressor 87, and butane compressor 93, which are connected to a common driver, required a total of 1.42 horsepower hours.

Modifications in operation of the equipment may be made with little change in yield of liquid products. For example, butane product may be withdrawn from receiver 95 and butane circulation through line 97 as a solvent and refrigerant may be diminished accordingly. Reflux through line 89 may be increased to compensate for the reduced butane refrigeration, and the product in line 91 is commercial propane having a vapor pressure of 175 p.s.i.g. at 100° F.

In another instance, no reflux may be returned through line 89, the butane solvent circulation through line 97 being increased slightly, and the liquid in line 84 is admitted to the shell of section 56 through valve 85 near the top. In this case, section 56 is operated as an absorber-stripper. A small amount of pentane appears in line 91 but the product LPG, still meets commercial specifications.

In still another instance, butane solvent is not circulated and liquid-petroleum gas is increased through the line 89 in order to provide the desired reflux. In this case, section 56 is operated as a dephlegmator-fractionator. The result is higher butane and lower propane recoveries.

Specific examples and specific temperatures have been given herein but it is to be understood that the invention is not to be limited to specific compositions or specific conditions of temperature and pressure. The methods described may be used under any conditions at which vapor and liquid phtses may coexist. That is to say, the processes may be operated at any pressure and corresponding temperature below the critical pressure for any mixture in the separation process. Generally, the pressure is limited by the critical pressure of the overhead product.

Figure 6:
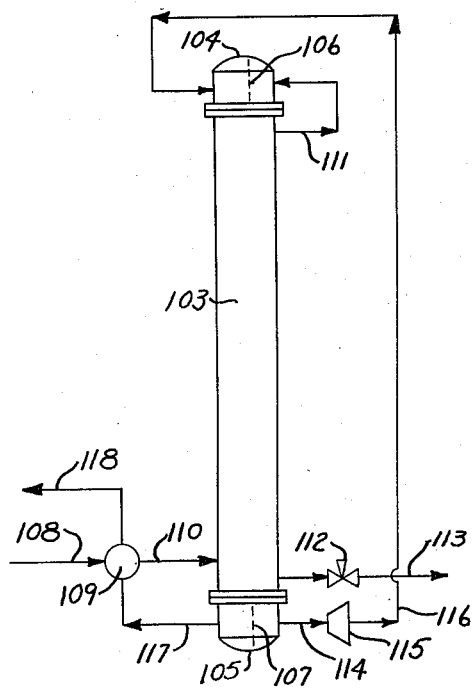
Fig. 6 illustrates a hydrocarbon recovery process wherein one side of the heat exchange surface of the unit is used for selective condensation and the other side is used to supply refrigeration of the sensible heat type.

Fig. 6 illustrates a process for recovery of gas or liquid hydrocarbons from a gas which is to be reduced in pressure. Energy contained in the high pressure gas is used to provide refrigeration. This scheme illustrates a case in which the apparatus is used with counter-current contacting occurring on just one side of the heat exchange surface.

The vertical exchanger unit 103 is similar to the apparatus of Fig. 1, and the top and bottom tube covers 104 and 105 are divided into two compartments by divider plates 106 and 107. Gas under high pressure in line 108 is cooled in conventional heat exchanger 109 and conducted through line 110 into the lower end of the shell side of exchanger 103. The gas passing upward over the tube bank is further chilled and fractionally condensed before leaving through line 111. The liquid collecting on the tubes flows back downward counter-current to the gas. Liquid collecting at the bottom is discharged through the valve 112 and line 113, and, if required, is degassed or stabilized by further processing (not shown).

Stabilization may be accomplished by flashing into the shell side of a fractionating exchanger like that in Fig. 3, having the tube side in parallel with the shell side of exchanger 103. That is to say, line 27 would branch off line 110 and line 29 would join line 111. Alternatively, the liquid could be stabilized by flashing into a third compartment (not shown) in the tube side of exchanger 103.

Referring again to Fig. 6, the chilled gas in line 111 is rewarmed in passing down through one compartment of the tube side of exchanger 103, leaving at the bottom through line 114 to expander 115 wherein heat content of the gas is converted to useful mechanical energy, thus providing refrigeration, as the pressure is reduced. The gas leaves the expander 115 through line 116 at a lower temperature than that obtained in line 111, and is passed down through the other tube side compartment of exchanger 103, thereby providing the refrigeration required to condense liquids. Low pressure gas leaving through line 117 is warmed by the feed gas in heat exchanger 109 before being discharged through line 118.

Rewarming the gas before expansion, as shown in Fig. 6, is not essential, but is generally desirable from an equipment standpoint, particularly for centrifugal expanders.

Figure 8:
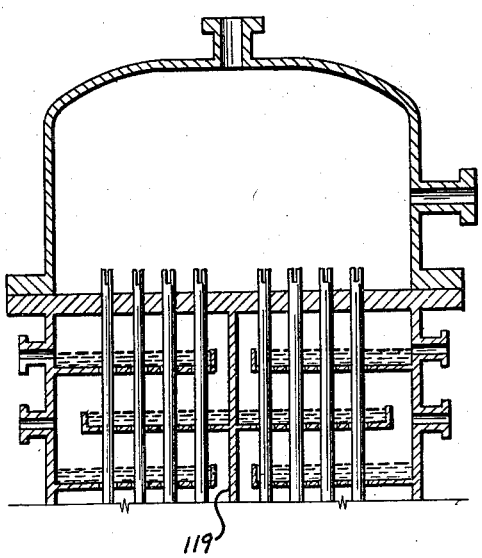
Fig. 8 is a fragmentary view of a further modified form of unit wherein the shell is divided by a vertical partition.

Various modifications of the apparatus may be made within the scope of the invention. For example, the tube side may be divided into compartments, as described in connection with Fig. 5, by providing either the top and/or bottom covers with divider plates as shown. The shell side may be similarly divided by use of a vertical partition 119 as shown in Fig. 8.

Also, either tube sheet 12 or 13 may be made "floating" to prevent thermal stresses. In this case, an inlet or outlet stream may be conducted either through tubes to a separate compartment in the fixed tube sheet cover or thorugh a slidable packing gland of conventional design in the shell cover over the floating tube sheet. It is obvious that two streams can be handled through a single packing gland by use of a double pipe, one inside the other, thus providing an annular passage.

Figure 7:
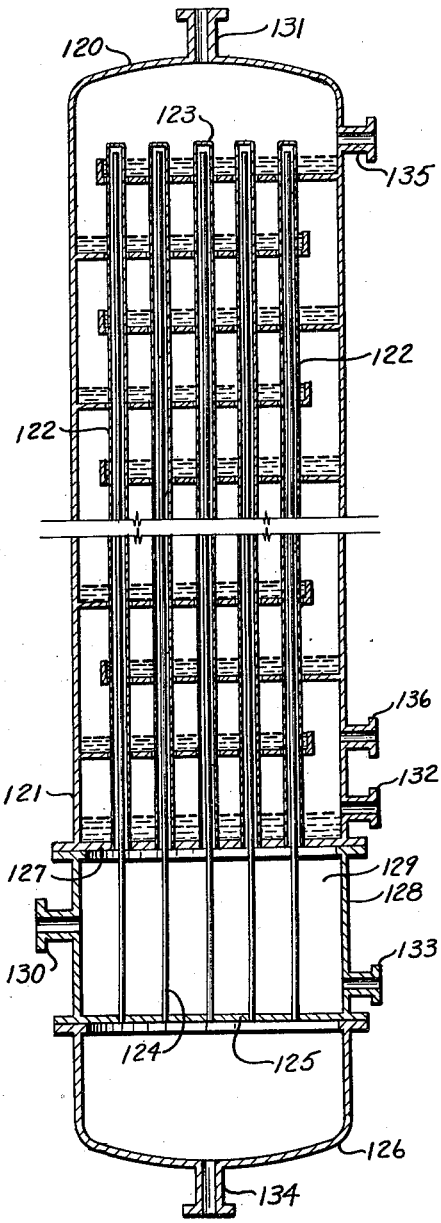
Fig. 7 is a vertical section through a modified form of dephlegmating and stripping unit embodying features of the present invention.

Another modification of the apparatus is shown in Fig. 7 wherein the bayonet tube design is employed. The upper end 120 of the vessel 121 is closed. The tubes 122 are closed at the top 123, and a bundle of small bayonet tubes 124 provided with a tube sheet 125 and cover 126 at the bottom, is inserted from the lower end into the bundle of larger tubes 122, thus providing both passageway and heat exchange surface for the gas leaving the top of the tubes 124.

In this instance, the tube sheet 125 is spaced from the tube sheet 127 by channel 128 that forms a manifold chamber 129 supplying gas or vapors to the tubes 122, the inlet to the chamber being through a nozzle 130. Outlets 131, 132 are provided at the upper and lower portions of the shell. The channel section 128 and cover 126 have outlets 133 and 134 respectively. The upper end of the shell has an inlet 135 and the lower end has a vapor outlet 136.

Also, the surface of the tubes may be extended, if desired, in any of the well known ways, such as by use of fins either inside or outside the tubes in order to increase the contact area.

The processes are characterized by at least one counter-current vapor-liquid separation process and heat exchange occurring in the same place wherein the heat exchange occurs over a temperature range on each side with a relatively small temperature difference such that the warm end of the cold side is substantially warmer than the cold end of the warm side. Heat transfer occurs with a moderate temperature drive throughout, which fact results in a low energy requirement to perform a given separation. Thus it will be apparent that the invention represents a substantial advance, both technically and economically, over present practices.

What I claim and desire to secure by Letters Patent is:

1. The method of fractionating a hydrocarbon mixture including, passing the hydrocarbon mixture into contact with one side of an indirect heat exchange surface to effect selective condensation thereon of less volatile components of the hydrocarbon mixture while maintaining vapors of said hydrocarbon mixture in counter-current contact with the condensate on said heat exchange surface, collecting the condensate, reducing pressure on the condensate for cooling the condensate, directing the cooled condensate in descending contact with the other side of the indirect heat exchange surface to receive heat from said hydrocarbon mixture for vaporizing the more volatile components thereof while maintaining the vapors in stripping contact with said condensate, increasing the pressure of the last formed vapor, uniting said last formed vapor with the influent hydrocarbon mixture for ascension therewith in said heat exchange contact to effect condensation of the less volatile components, and separately removing said separated components.

2. The method of separating a hydrocarbon mixture including passing the hydrocarbon mixture into contact with one side of an indirect heat exchange surface to effect condensation thereon of the less volatile components of the hydrocarbon mixture while maintaining vapors of said mixture in counter-current contact with the condensate on the said one side of the indirect heat exchange surface, collecting the condensate, reducing the pressure on the condensate for cooling the condensate, discharging the cooled condensate in descending contact with the other side of the indirect heat exchange surface to receive heat from said fluid mixture for vaporizing the more volatile components contained therewith while maintaining the vapor in stripping contact with said condensate, increasing the pressure of the last formed vapor, uniting said last formed vapor with the influent hydrocarbon mixture for ascension therewith in said heat exchange contact to effect condensation of the less volatile components, and removing the vapors of the more volatile components separately from the condensate of the less volatile fluid.

3. The method of separating a hydrocarbon mixture including passing the mixture into contact with one side of an indirect heat exchange surface to effect condensation thereon of the less volatile components while maintaining vapors of said mixture in counter-current contact with the condensate on the said one side of the indirect heat exchange surface, collecting the condensate, reducing the pressure on the condensate for cooling the condensate, directing the cooled condensate in descending contact with the other side of the indirect heat exchange surface to receive heat from said hydrocarbon mixture for vaporizing the more volatile components contained therewith, compressing the last formed vapor to a pressure corresponding to the pressure of the influent hydrocarbon mixture, uniting said last formed vapor with the influent hydrocarbon mixture for ascension therewith in said heat exchange contact to effect condensation of the less volatile components while maintaining the vapor in stripping contact with said condensate, and removing the vapors of the more volatile components separately from the condensate of the less volatile components.

4. The method of separating individual components of a fluid mixture including, partially dehydrating the mixture, passing the fluid mixture into contact with one side of a heat exchange surface to effect condensation thereon of less volatile components of the fluid at the pressure of said mixture while maintaining vapor of said fluid mixture in contact with the vapor ascending and the condensate descending on said one side of the heat exchange surface, effecting further dehydration of the vapor and passing the vapor in heat exchange contact with one side of a second heat exchange surface to effect condensation of portions of said vapors, collecting the condensate from both heat exchange steps, subcooling the collected condensate by contact with one side of a third heat exchange surface that is cooled on the other side by flashing and rewarming of the subcooled condensate, separately discharging vapors resulting therefrom and the flashed and rewarmed condensate, conducting the flashed and rewarmed condensate into a fractionating zone in immediately surrounding contact with and receiving heat from the said other sides of first two heat exchange surfaces, removing the vapors from said fractionating zone, and separately collecting the residual condensate.

5. The method as described in claim 4 wherein the said one side of the second heat exchange surface is wetted by contact with a solvent that has been cooled simultaneously with the subcooling of the condensate.

6. The method of treating a hydrocarbon liquid mixture of components of different volatility, including subcooling the liquid mixture by upward flow contact with one side of an indirect heat exchange surface, flashing the subcooled liquid mixture to a lower pressure stripping zone immediately surrounding the other side of said heat exchange surface, rewarming and stripping the flashed liquid within said zone of the more volatile components while flowing the flashed liquid mixture downwardly in countercurrent heat exchange with the initial liquid mixture to effect said subcooling thereof, removing rewarmed liquid from the bottom of the stripping zone, and separately removing from the top of said stripping zone the vapors of said more volatile components which result from flashing and rewarming of said flashed liquid in countercurrent flow to the flashed liquid being rewarmed.

7. The method of fractionating a hydrocarbon mixture containing liquid, including passing the hydrocarbon mixture into a stripping zone on one side of an indirect heat exchange surface to receive heat therefrom for selective vaporization of more volatile components of the hydrocarbon mixture while maintaining the resulting vapors in upward flow contact and the liquid of the mixture in downward flow on said indirect heat exchange surface, collecting the vapors at the top of the stripping zone, compressing the collected vapors to heat the vapors, directing the heated vapors for ascension through a condensing zone at the other side of the indirect heat exchange surface to supply said heat and effect condensation of less volatile components in the compressed vapor, collecting the condensate from the bottom of the condensing zone, reducing pressure of the collected condensate, returning the condensate to the stripping zone at the said one side of the indirect heat exchange surface, and separately removing condensate from the bottom of the stripping zone and vapors from the top of the condensing zone.

8. The method of separating more volatile components of a fluid mixture, including passing the fluid mixture for upward flow into a condensing zone at one side of an indirect heat exchange surface to effect selective fractional condensation thereon of less volatile components at the pressure of said fluid mixture for downward flow of said condensate on the heat exchange surface, removing the more volatile components of the mixture from the top of the condensing zone, collecting the condensate from the bottom of the condensing zone, flashing the condensate at a lower pressure into a stripping zone maintained immediately surrounding the other side of the heat exchange surface and separate from and maintained at a lower pressure than the condensing zone to cool the condensate and remove the heat from said one side to effect stripping of the more volatile components from said condensate and to effect the said fractional condensation on the said one side of the heat exchange surface, removing the condensate from the bottom of the stripping zone to provide a condensate product, and separately removing the vapor from the said stripping zone.

9. The method of separating more volatile components of a fluid mixture as described in claim 8, and including the steps of compressing the removed vapor, and returning the vapor to said condensing zone of higher pressure at said one side of the indirect heat exchange surface for recirculation with the initial fluid mixture.

References Cited in the file of this patent

UNITED STATES PATENTS

| | | |
|---|---|---|
| 546,946 | Theisen | Sept. 24, 1895 |
| 1,808,087 | Urquhart | June 2, 1931 |
| 1,870,096 | Claude | Aug. 2, 1932 |
| 1,960,770 | Brown | May 29, 1934 |
| 1,969,135 | Jacocks et al. | Aug. 7, 1934 |
| 2,151,248 | Vaughan | Mar. 21, 1939 |
| 2,205,765 | Kleiber | June 25, 1940 |
| 2,205,766 | Kuhl | June 25, 1940 |
| 2,222,583 | Kraft | Nov. 19, 1940 |
| 2,281,906 | Adams | May 5, 1942 |
| 2,344,984 | Fenske | Mar. 28, 1944 |
| 2,377,736 | White | June 5, 1945 |
| 2,403,922 | Hawthorne | July 16, 1946 |
| 2,580,646 | Belden | Jan. 1, 1952 |
| 2,663,669 | Barnes | Dec. 22, 1953 |
| 2,715,323 | Johnson | Aug. 16, 1955 |
| 2,768,118 | Laurence et al. | Oct. 23, 1956 |
| 2,804,292 | Schilling | Aug. 27, 1957 |